United States Patent
Sims et al.

(10) Patent No.: US 9,419,413 B2
(45) Date of Patent: Aug. 16, 2016

(54) ARC MANAGEMENT SYSTEM FOR AN ELECTRICAL ENCLOSURE ASSEMBLY

(71) Applicant: Eaton Corporation, Cleveland, OH (US)

(72) Inventors: Daniel Garett Sims, Newberry, SC (US); John Joseph Shea, Pittsburgh, PA (US); Michael Davis Pearce, Plum Branch, SC (US); Michael Howard Abrahamsen, Greenwood, SC (US)

(73) Assignee: EATON CORPORATION, Cleveland, OH (US)

( * ) Notice: Subject to any disclaimer, the term of this patent is extended or adjusted under 35 U.S.C. 154(b) by 156 days.

(21) Appl. No.: 14/277,821

(22) Filed: May 15, 2014

(65) Prior Publication Data

US 2015/0333486 A1   Nov. 19, 2015

(51) Int. Cl.
  *H01T 4/14* (2006.01)
  *H01T 4/08* (2006.01)
  *H02B 1/18* (2006.01)
  *H02G 5/06* (2006.01)
  *H02B 11/26* (2006.01)

(52) U.S. Cl.
  CPC .. *H01T 4/08* (2013.01); *H02B 1/18* (2013.01); *H02B 11/26* (2013.01); *H02G 5/06* (2013.01); *H01T 4/14* (2013.01)

(58) Field of Classification Search
  CPC .............. H01T 4/08; H01T 4/14; H02B 1/18; H02G 5/06
  USPC ........................................................ 361/137
  See application file for complete search history.

(56) References Cited

U.S. PATENT DOCUMENTS

| 1,947,321 A | 2/1934 | Vincent et al. |
| 2011/0149478 A1* | 6/2011 | Shea .................... H02B 13/025 361/601 |

* cited by examiner

*Primary Examiner* — Thienvu Tran
*Assistant Examiner* — Kevin J Comber
(74) *Attorney, Agent, or Firm* — Eckert Seamans Cherin & Mellott, LLC; Philip E. Levy; David C. Jenkins

(57) ABSTRACT

An arc management system for an electrical enclosure assembly is provided. The electrical enclosure assembly includes a housing assembly and a conductive bus assembly. The arc management system includes a number of conductive bus extension assemblies, a number of first and second arc horn assemblies, and a number of ground conductor assemblies. Each conductive bus extension assembly includes a conductive member coupled to the conductive bus assembly. Each first arc horn assembly includes a conductive arc horn member. Each first arc horn member is in electrical communication with an associated bus extension conductive member. Each second arc horn assembly includes a conductive arc horn member. Each ground conductor assembly includes a ground conductive member. Each second arc horn member in electrical communication with an associated ground conductor assembly ground conductive member. Each first arc horn member is associated with a second arc horn member and disposed an effective distance therefrom.

20 Claims, 6 Drawing Sheets

ARC MANAGEMENT SYSTEM FOR AN ELECTRICAL ENCLOSURE ASSEMBLY

BACKGROUND OF THE INVENTION

1. Field of the Invention

The disclosed concept relates generally to an electrical enclosure assembly and, more particularly, to an arc management system for an electrical enclosure assembly.

2. Background Information

An electrical enclosure assembly includes a housing assembly and a conductive bus assembly. The housing assembly is structured to enclose an electrical apparatus such as, but not limited to, an electrical switching apparatus. The bus assembly includes a number of conductive bus members that are coupled to, and in electrical communication with, one of a line or a load. The bus assembly is structured to be coupled to, and in electrical communication with, the electrical apparatus.

In response to an overcurrent condition, the electrical apparatus may generate an arc within the housing assembly. Such an arc heats the atmosphere in the housing assembly, causing a sudden increase in pressure, and generates various gases. The pressure increase, as well as the arc gases, can damage the electrical apparatus, the housing assembly, and the conductive bus assembly.

There is, therefore, room for improvement in an electrical enclosure assembly whereby an arc is controlled. Controlling the arc minimizes the damage caused by the pressure increase, as well as the arc gases.

SUMMARY OF THE INVENTION

At least one embodiment of this invention provides for an arc management system for an electrical enclosure assembly. The electrical enclosure assembly includes a housing assembly and a conductive bus assembly. The housing assembly includes a number of generally planar sidewalls defining an enclosed space. The conductive bus assembly includes a number of conductive bus members. The conductive bus members are generally disposed within the enclosed space and are spaced from the sidewalls. The arc management system includes a number of conductive bus extension assemblies, a number of first and second arc horn assemblies, and a number of ground conductor assemblies. Each conductive bus extension assembly includes a grounded conductive member. Each first arc horn assembly includes a conductive arc horn member. Each first arc horn member is in electrical communication with an associated bus extension conductive member. Each second arc horn assembly includes a conductive arc horn member. Each ground conductor assembly includes a ground conductive member. Each second arc horn member is in electrical communication with an associated ground conductor assembly ground conductive member. Each first arc horn member is associated with a second arc horn member and disposed an effective distance therefrom.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
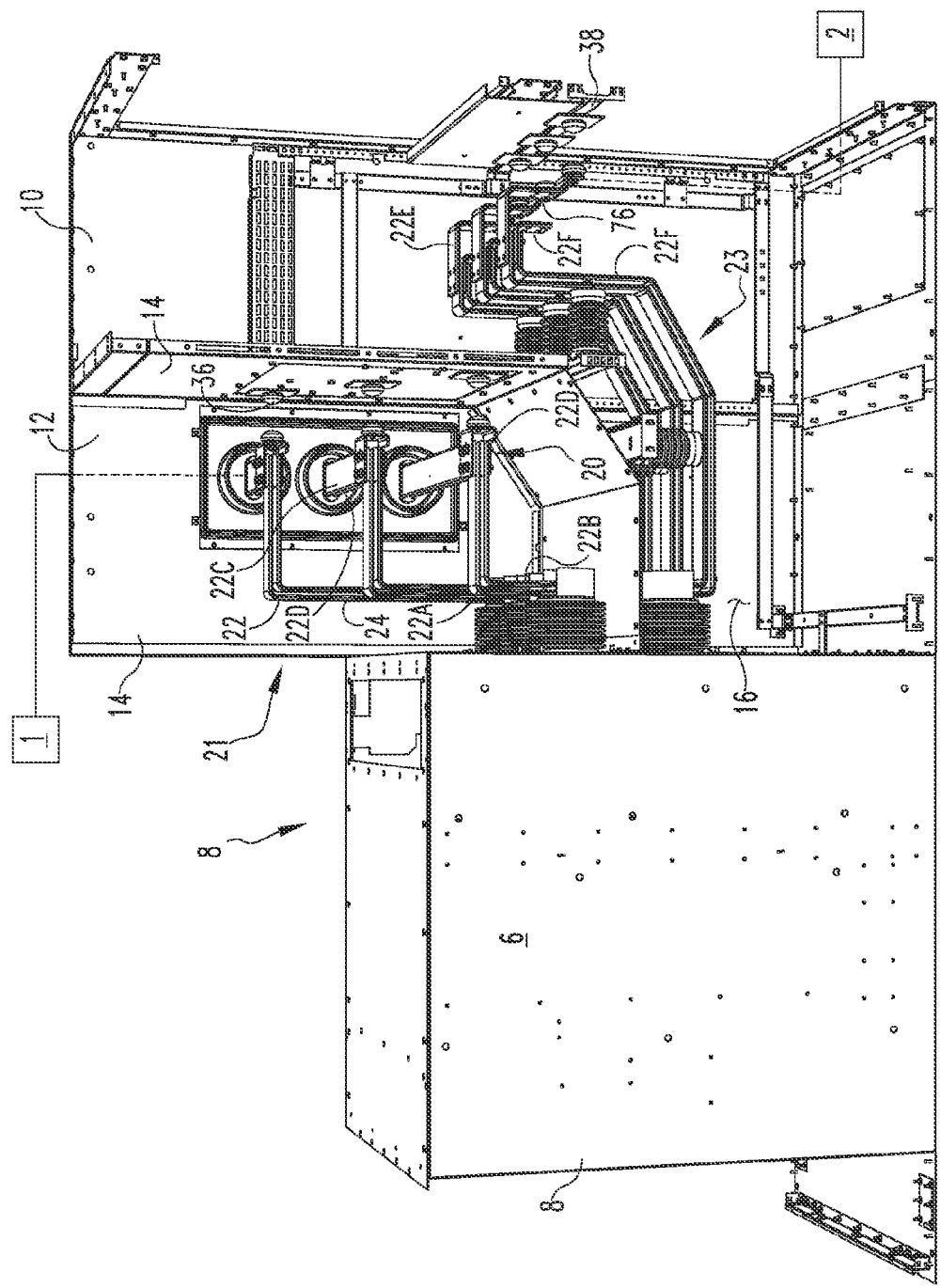
FIG. 1 is an isometric view of an electrical apparatus with an arc management system.
Figure 2:
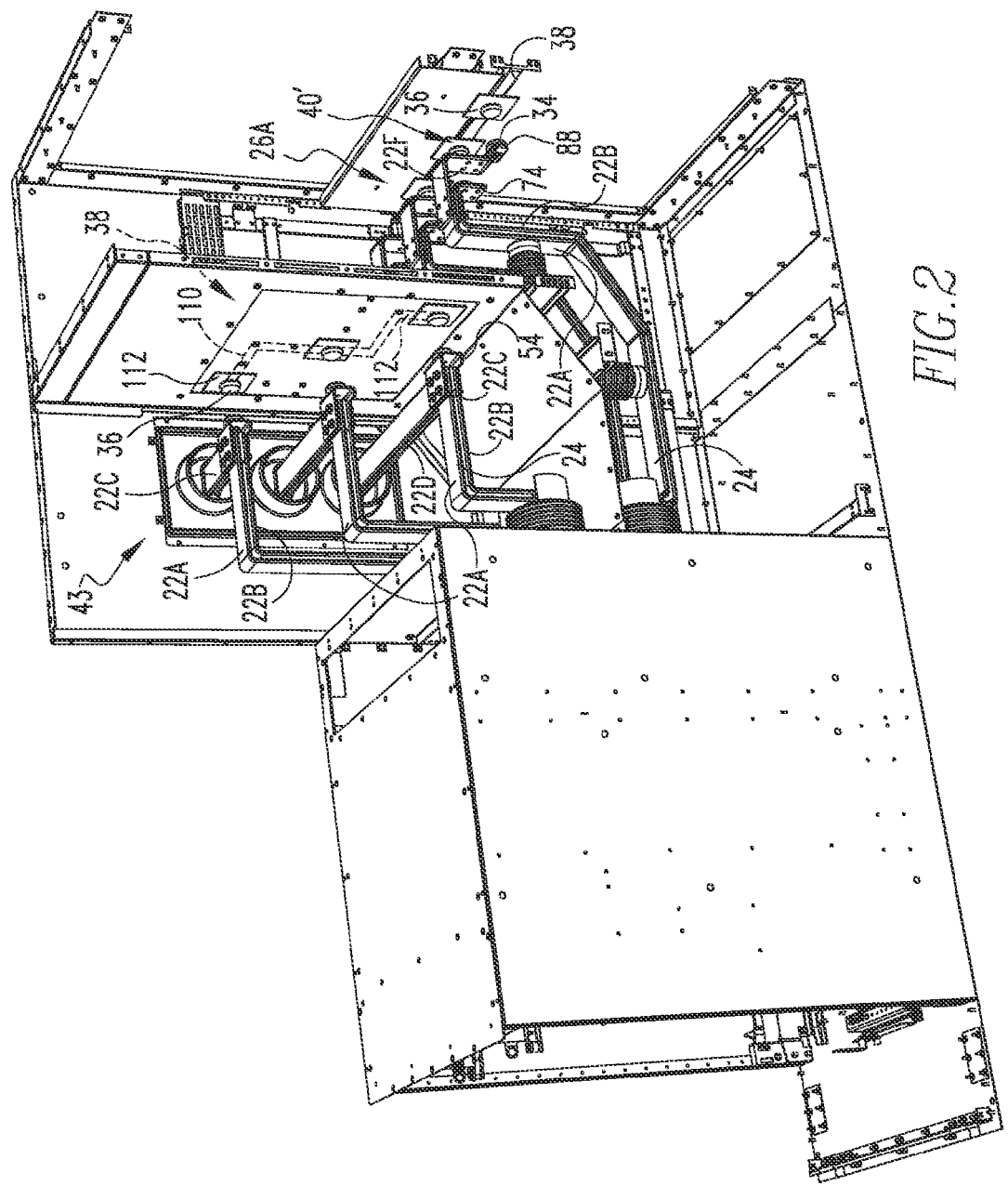
FIG. 2 is another isometric view of an electrical apparatus.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, "actuator" and "actuating element" mean any known or suitable output mechanism (e.g., without limitation, trip actuator, solenoid, a flux shunt trip actuator) for an electrical switching apparatus and/or the element (e.g., without limitation, stem; plunger; lever, paddle; arm) of such mechanism which moves in order to manipulate another component of the electrical switching apparatus.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof.

As used herein, the statement that two or more parts or components "engage" one another shall mean that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A either engages element B while in element A first position.

As used herein, the word "unitary" means a component is created as a single piece or unit. That is, a component that includes pieces that are created separately and then coupled together as a unit is not a "unitary" component or body.

As used herein, the term "number" shall mean one or an integer greater than one (i.e., a plurality).

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are said to fit "snugly" together or "snuggly correspond." In that situation, the difference between the size of the components is even smaller whereby the amount of friction increases. If the element defining the opening and/or the component inserted into the opening is made from a deformable or compressible material, the opening may even be slightly smaller than the component being inserted into the opening. This definition is further modified if the two components are said to "substantially correspond." "Substantially correspond" means that the size of the opening is very close to the size of the element inserted therein; that is, not so close as to cause substantial friction, as with a snug fit, but with more contact and friction than a "corresponding fit," i.e., a "slightly larger" fit.

As used herein, an "effective distance" for arc horns is the distance apart the arc horns may be spaced while generating an arc therebetween. Generally the "effective distance" relates to the system voltage associated with the arc horns; the greater the system voltage associated with the arc horns, the further apart the arc horns may be disposed. As a non-limiting example, arc horns associated with a system voltage of 38 kV are spaced about 3.25 inches apart.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies.

As used herein, "operatively coupled" means that a number of elements or assemblies, each of which is movable between a first position and a second position, or a first configuration and a second configuration, are coupled so that as the first element moves from one position/configuration to the other, the second element moves between positions/configurations as well. It is noted that a first element may be "operatively coupled" to another without the opposite being true. For example, a trip bar may be "operatively coupled" to a circuit breaker operating mechanism, meaning that when the trip bar moves, so does the operating mechanism, but, the operating mechanism may not be "operatively coupled" to the trip bar, meaning that the operating mechanism may be manually operated, e.g. by a handle, without necessarily moving the trip bar.

As shown in FIG. 1, an electrical apparatus 6, such as, but not limited to an electrical switching apparatus 8, is disposed in an electrical enclosure assembly 10 (some elements shown schematically). The electrical apparatus 6 is in electrical communication with a line 1 and a load 2 (shown schematically). The electrical enclosure assembly 10 includes a housing assembly 12 and a conductive bus assembly 20. The housing assembly 12 includes a number of generally planar sidewalls 14 defining an enclosed space 16. As is known, the housing assembly 12 includes a movable sidewall 14 such as, but not limited to a door (not shown). A number of housing assembly sidewalls 14 include openings for coupling assemblies to pass through.

The conductive bus assembly 20 includes a number of conductive bus members 22. In an exemplary embodiment, the conductive bus members 22 are elongated, generally planar members 24. As shown, the conductive bus planar members 24 may be bent. The number and cross-sectional area of bus members 22 are dependent upon the ratings of the electrical apparatus 6 disposed in the electrical enclosure assembly 10. As shown in an exemplary embodiment, the electrical apparatus 6 disposed in the electrical enclosure assembly 10 is an electrical switching apparatus 8 having three poles that are each associated with a line or a load. That is, there are a number of line conductive assemblies 21 and a number of load conductive assemblies 23. As shown, each pole on the line side of the electrical switching apparatus 8 has a first pair of generally parallel bus members 22A, 22B coupled thereto and in electrical communication therewith (the load side conductive bus members 22E, 22F are discussed below). Further, as shown in an exemplary embodiment, the number of bus members 22 further includes a second pair of generally parallel bus members 22C, 22D that are coupled to, and in electrical communication with, the bus members 22A, 22B. The second pair of bus members 22C, 22D extend outside the housing assembly 12 and are coupled to a line or load (not shown). As shown, the first pair of bus members 22A, 22B and the second pair of bus members 22C, 22D are coupled at a conductive bus joint 26 and form, generally, a right angle. At the conductive bus joint 26, the four bus members 22A, 22B, 22C, 22D are stacked and the conductive bus joint 26 has a thickness (t). Further, as shown, the conductive bus joint 26 is a generally solid parallelepiped. The joint 26 further defines a number of passages 28. That is, each of the four bus members 22A, 22B, 22C, 22D define a number of openings (not shown) disposed in a pattern such that when the four bus members 22A, 22B, 22C, 22D form the joint 26, the openings form passages 28 through the joint 26.

An arc management system 30 includes a number of conductive bus extension assemblies 32, a number of first and second arc horn assemblies 34, 36, and a number of ground conductor assemblies 38. The arc management system 30 is structured to create a number of arcs at a selected location within the housing assembly 12, e.g. spaced from the electrical apparatus 6 and near a vent opening in a housing assembly sidewall 14. Each group of associated arc management system 30 components are substantially similar and only one of each component is described herein.

In an exemplary embodiment, each conductive bus extension assembly 32 includes a conductive member 40 and a coupling assembly 42 including a number of first and second coupling components 43, 45; as shown, nuts 47 and bolts 49. In this exemplary embodiment, the conductive member 40 is a conductive body 44 that, originally, is an elongated, generally planar body. The conductive member body 44 is, in an exemplary embodiment, reshaped so as to be generally "J" shaped. That is, the conductive member body 44 includes a generally planar extended leg 50, a generally planar bight 52 and a generally planar truncated leg 54. The extended leg 50 and the truncated leg 54 extend generally perpendicular to the bight 52, and, from the same side of the bight 52. The bight 52 has a length slightly greater than the thickness of the conductive bus joint 26. In this configuration, the conductive member 40 is structured to extend partially about the conductive bus joint 26. That is, as used herein, "extend partially about" means that an element extends over at least one side of a parallelepiped, or, over an arc of about 90 degrees on a cylindrical element. Further, in an exemplary embodiment, the extended leg 50 and the bight 52 each include a coupling component, as shown, a number of openings 57, 59, respectively. The extended leg openings 57 are disposed in a pattern that corresponds to the joint passages 28.

As shown, the conductive member 40 is coupled to the conductive bus members 22 by the conductive bus extension assembly coupling assembly 42. In an exemplary embodiment, the four conductive bus members 22A, 22B, 22C, 22D, as well as the conductive member 40, each include a number of passages (not shown). The passages in the conductive bus members 22A, 22B, 22C, 22D are aligned at the location of the conductive bus joint 26. In this embodiment, the conductive bus extension assembly coupling assembly 42 is a coupling such as a number of nuts 47 and bolts 49, as shown. The conductive member body extended leg 50 is placed on, and in electrical communication with, conductive bus member 22D. The bolts 49 are passed through all the passages and secured with the nuts 47. In this configuration, the conductive member 40 is coupled to, and in electrical communication with, the associated conductive bus members 22A, 22B, 22C, 22D. Further, the conductive member 40 extends partially about the conductive bus joint 26.

Figure 3:
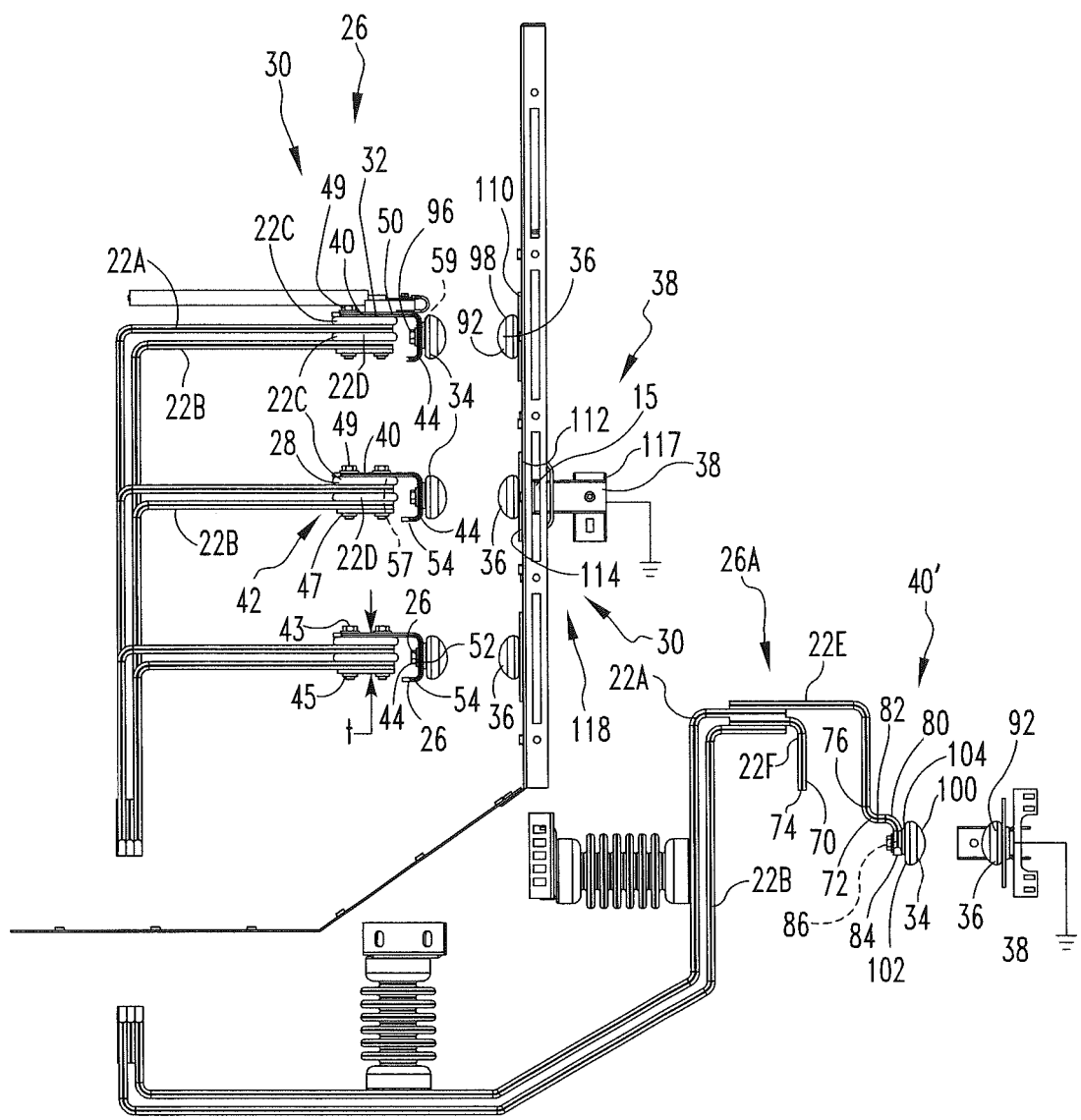
FIG. 3 is a side view of an arc management system.
Figure 4:
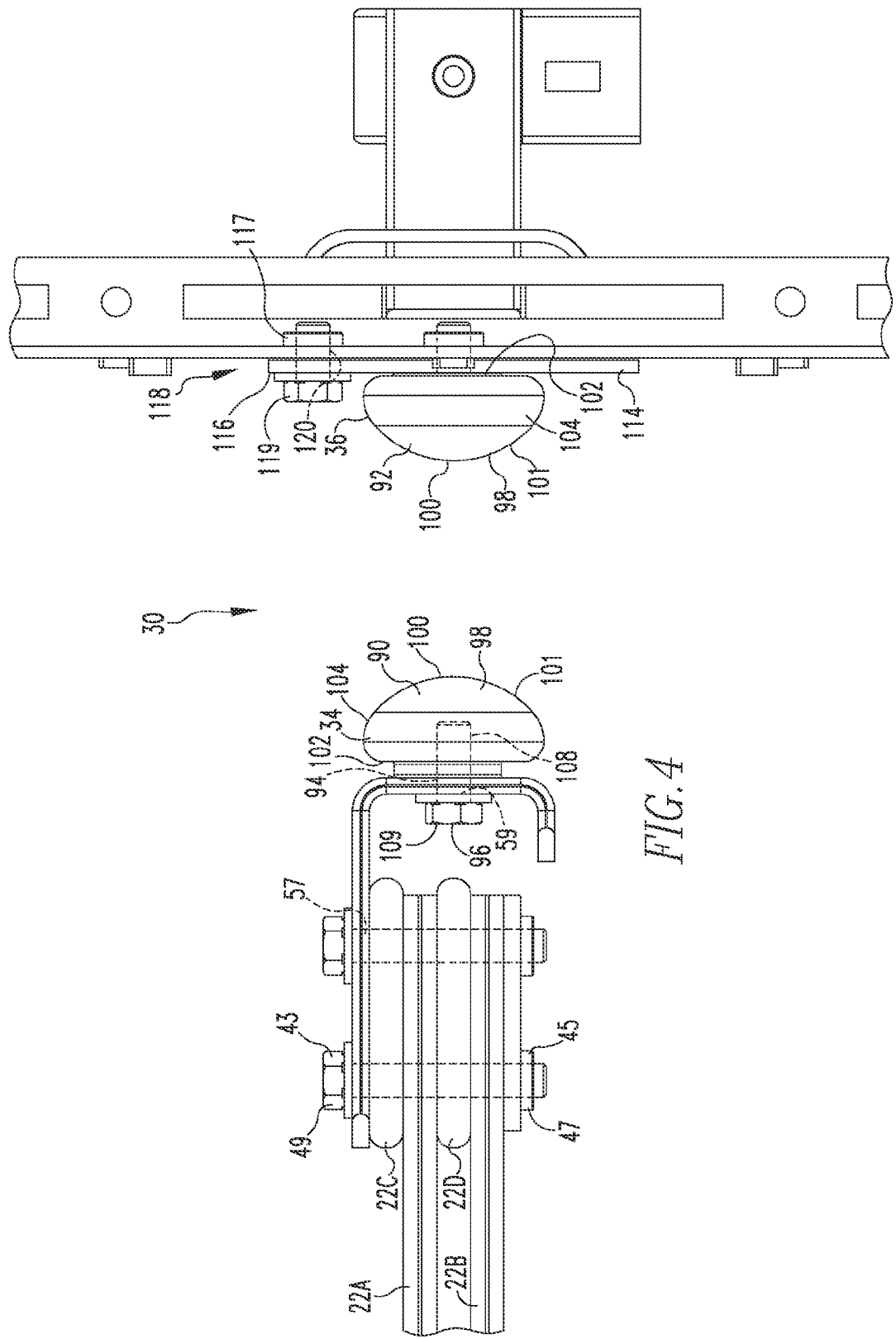
FIG. 4 is a detail side view of a pair of arc horns.
Figure 5:
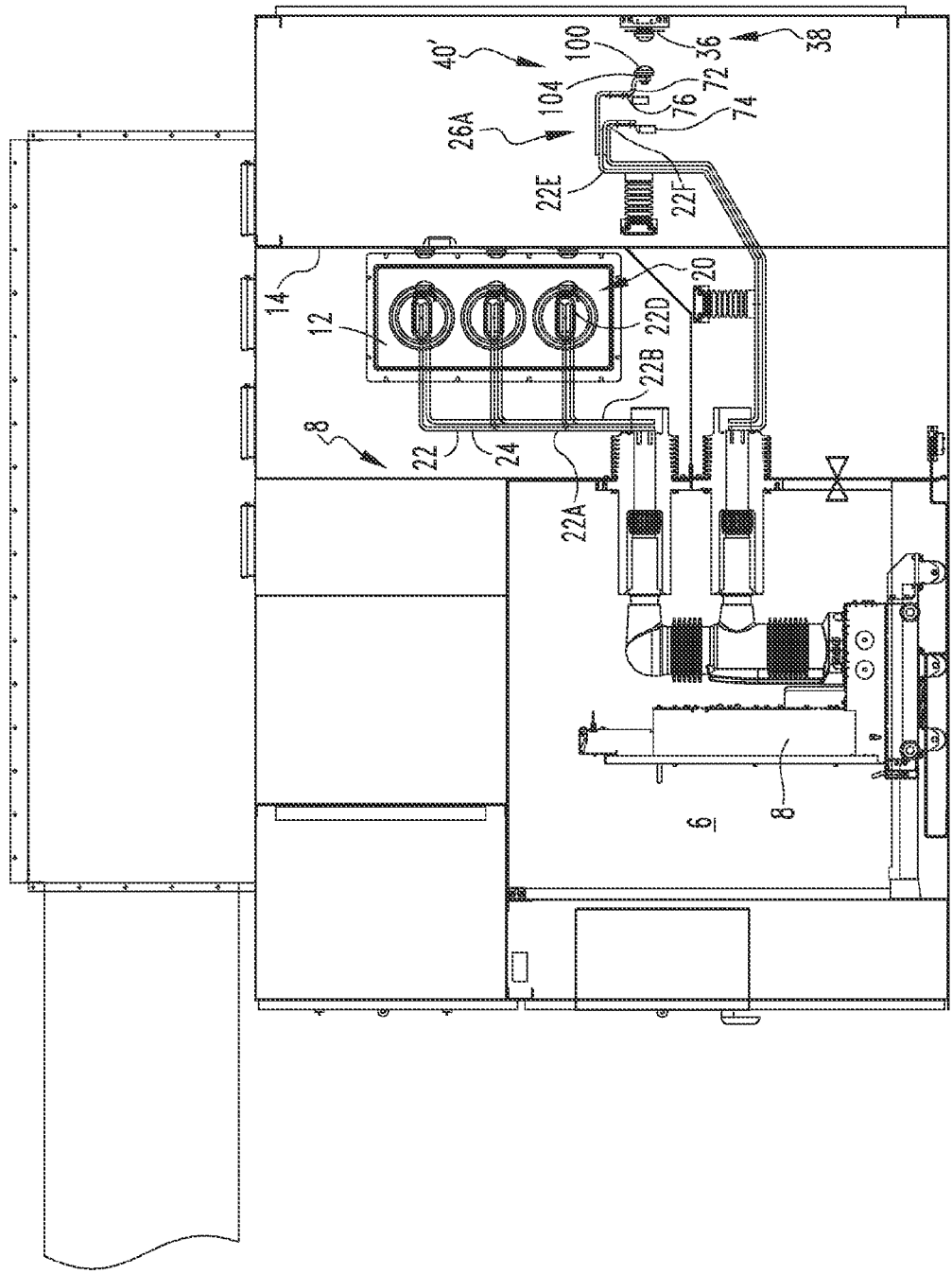
FIG. 5 is a side view of an electrical apparatus with an arc management system.
Figure 6:
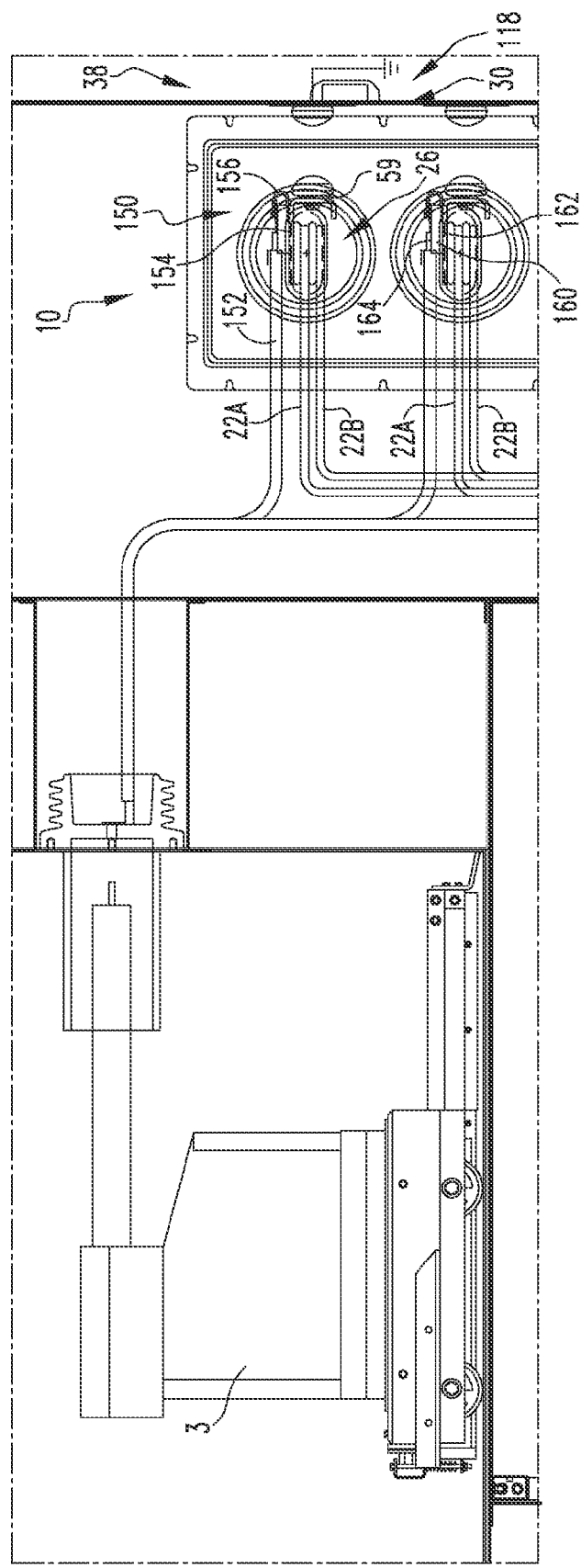
FIG. 6 is a detail side view of an alternate electrical apparatus with an arc management system.

In an alternate embodiment, shown in FIG. 3, the conductive bus assembly bus members 22 include landing pads 70, 72. As is known, the landing pads 70, 72 are coupled to, and are in electric communication with, a load device (not shown). Such a load device may be disposed inside the housing assembly 12 or the load conductive assembly 23 may extend outside the housing assembly 12 (not shown). In this embodiment, a second pair of conductive bus members 22E, 22F are bent so as to form generally L-shaped bodies. As shown, the second pair of conductive bus members 22E, 22F are in electrical communication with the line side of the electrical apparatus 6. As before, the first pair of bus members 22A, 22B and the second pair of bus members 22E, 22F are coupled at a conductive bus joint 26A. The landing pads 70, 72, that is, the second pair of bus members 22E, 22F, have a distal end 74, 76. Each landing pad 70, 72 defines an opening sized to correspond to the conductive bus extension assembly first and second coupling components 43, 45.

In this embodiment, each conductive bus extension assembly 32 includes a conductive member 40'. The bus extension assembly conductive member 40' includes an L-shaped member 80. In an exemplary embodiment, the bus extension assembly conductive member 40' is disposed at a landing pad distal end 74 and is unitary with one of the second pair of bus members 22E. In this configuration, the L-shaped member 80 includes a proximal portion 82 and a distal portion 84 which are, generally, the two straight portions of the L-shaped member 80. In an exemplary embodiment, the L-shaped member proximal portion 82 extends generally horizontally. Further, the L-shaped member distal portion 84 includes a coupling component, as shown an opening 88.

Each first and second arc horn assembly 34, 36 is substantially similar. Each first and second arc horn assembly 34, 36 includes an arc horn member, i.e. a first arc horn member 90 or a second arc horn member 92, respectively, and a coupling assembly with a first and second component 94, 96. Each arc horn member 90, 92 includes a conductive body 98. In an exemplary embodiment, each arc horn member body 98 is generally a circular disk having a front surface 100, a back surface 102, and a radial surface 104. Each arc horn member body front surface 100 is an arcuate surface 101. As used herein, an "arcuate surface" includes surfaces that are curved, generally parabolic, generally spheroidal, or a segmented arcuate surface such as a number of generally planar surfaces that approximate an arcuate surface (similar to a cut jewel). In an exemplary embodiment, each arc horn member body front surface 100 is generally spheroidal, covering an arc of between about 140 degrees and 200 degrees, or about 180 degrees. Each arc horn member body back surface 102 defines the first coupling component 94 which, in an exemplary embodiment, is a threaded opening 108 sized to correspond to the second coupling component 96 such as a bolt 109.

A ground conductor assembly 38 is associated with each second arc horn assembly 36. Each ground conductor assembly 38 includes a number of conductive members 110 (hereinafter "ground conductive member 110"), a number of insulating pads 114, and a number of coupling assemblies 118; as shown nuts 117 and bolts 119. Each ground conductive member 110 includes, in an exemplary embodiment, an elongated, generally planar body 112. Each ground conductive member 110 is coupled, directly coupled, or fixed to a housing assembly sidewall 14 by the coupling assemblies 118. That is, the housing assembly sidewall 14 and the ground conductive member body 112 each include openings disposed in a corresponding pattern. A coupling assembly 118, e.g. a bolt, is passed through the housing assembly sidewall 14 and the ground conductive member body 112 and secured to a nut, thereby coupling the ground conductive member to the housing assembly sidewall 14. Each ground conductive member 110 is further in electrical communication with a ground conductor (shown schematically).

Each insulating pad 114 includes a non-conductive, generally planar body 116 defining an opening 120. The insulating pad opening 120 is sized to correspond to an arc horn assembly second coupling component 96 such as a bolt 109. Each insulating pad 114 is disposed between a second arc horn member 92 and a housing assembly sidewall 14, as discussed below.

The arc management system 30 is assembled as follows. Each conductive bus extension assembly 32 is coupled, directly coupled, or fixed to a conductive bus member 22. In an exemplary embodiment, each conductive bus extension assembly 32 is coupled to the associated number of bus members 22 at a conductive bus joint 26. That is, the conductive member 40 is disposed over the conductive bus joint 26 with the extended leg openings 57 aligned with the joint passages 28. The conductive bus extension assembly coupling assembly 42, in an exemplary embodiment, nuts 47 and bolts 49, is used to couple each conductive bus extension assembly 32 to the associated bus joint 26.

In this configuration, each conductive bus extension assembly 32 is in electrical communication with the conductive bus member 22 or a landing pad 70. Moreover, as noted above, in an exemplary embodiment the conductive bus extension assembly 32 is structured to extend partially about the conductive bus joint 26. That is, the J-shaped conductive member body 44 extends partially about the associated conductive bus joint 26.

Each first arc horn member 90 is coupled, directly coupled, or fixed to an associated conductive bus extension assembly 32 and is further in electrical communication therewith. That is, each first arc horn member first coupling component 94, e.g. threaded opening 108, is aligned with a conductive member bight opening 59, and, an arc horn assembly second coupling component, e.g. bolt 109, is threaded into the threaded opening 108. Each arc horn member body front surface 100 faces a housing assembly sidewall 14.

Each ground conductive member 110 is coupled, directly coupled, or fixed to a housing assembly sidewall 14. As noted above, each ground conductive member 110 is disposed outside the housing assembly enclosed space 16. That is, the ground conductive members 110 are on the disposed outer surface of the housing assembly sidewall 14. Each ground conductive member 110 is coupled to a housing assembly sidewall 14 by a number of ground conductor assemblies coupling assemblies 118.

Each second arc horn member 92 is also coupled, directly coupled, or fixed to a ground conductive member 110. Initially, an insulating pad 114 is disposed on the inner side of a housing assembly sidewall 14 opposite a ground conductive member 110. The insulating pad opening 120 is aligned with a housing assembly sidewall opening 15. An arc horn assembly second coupling component, 96, e.g. a bolt 109 is passed through the ground conductive member 110, the housing assembly sidewall 14, the insulating pad 114 and into the arc horn threaded opening 108. Each second arc horn member 92 is disposed facing an associated first arc horn member 90 and is disposed an effective distance therefrom.

In an alternate embodiment, the electrical apparatus 8 includes a limiting component 3, such as, but not limited to a voltage transformer and/or a fuse (shown schematically and hereinafter identified collectively as "limiting components 3"). In an exemplary embodiment, when the electrical switching apparatus 8 includes a limiting component 3, the arc management system 30 includes a fuse link assembly 150. The fuse link assembly 150 includes auxiliary conductor 152, a dielectric mounting block 154 and a fusible wire 156. The auxiliary conductor 152 extends between, and is in electrical communication with, both the electrical apparatus fuse and the fusible wire 156. The dielectric mounting block 154 is, in an exemplary embodiment, a generally planar body 160 including a first mounting surface 162 and a second mounting surface 164. The dielectric mounting block 154 is disposed above, and coupled directly coupled or fixed, to the conductive member extended leg 50. That is, the dielectric mounting block body first mounting surface 162 is coupled, directly coupled or fixed, to the conductive member extended leg 50. The auxiliary conductor 152 is also coupled to the upper side of the dielectric mounting block 154. That is, the auxiliary conductor 152 is coupled, directly coupled or fixed to the dielectric mounting block body second mounting surface 164. In this configuration the auxiliary conductor 152 is electrically isolated from the conductive bus assembly 20. The fusible wire 156 extends from the auxiliary conductor 152 to the conductive bus assembly 20. That is, the fusible wire 156 is coupled to, and in electrical communication with, both the auxiliary conductor 152 and the conductive bus assembly 20. The fusible wire 156 is of a selected gauge, which varies with rated amperage and is structured to burn and/or melt under fault conditions while remaining intact long enough for the limiting component 3 to clear a fault in the electrical apparatus 8.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

Further, as used herein, any element initially identified in a claim's preamble is not a claim element even if such element is later recited in the claim. That is, the claims may recite a number of unclaimed elements in the preamble and later recite a relationship or an interaction between the unclaimed elements set forth in the preamble and the claimed elements. It is understood that even though the elements initially recited in the preamble are later recited in the body of the claim, those elements, i.e. the unclaimed elements identified in the preamble, are not claimed elements.

What is claimed is:

1. An arc management system for an electrical enclosure assembly structured to enclose an electrical apparatus, said electrical enclosure assembly including a housing assembly and a conductive bus assembly, said housing assembly including a number of generally planar sidewalls defining an enclosed space, said conductive bus assembly including a number of conductive bus members, said conductive bus members generally disposed within said enclosed space and spaced from said sidewalls, said arc management system comprising:

a number of conductive bus extension assemblies each including a conductive member;

a number of first arc horn assemblies each including a conductive arc horn member;

each first arc horn member in electrical communication with an associated bus extension conductive member;

a number of second arc horn assemblies each including a conductive arc horn member;

a number of ground conductor assemblies each including a ground conductive member;

each second arc horn member in electrical communication with an associated ground conductor assembly ground conductive member;

each first arc horn member associated with a second arc horn member and disposed an effective distance therefrom.

2. The arc management system of claim 1 wherein:

said first arc horn member including an arcuate surface;

said second arc horn member including an arcuate surface; and said first arc horn member arcuate surface and said second arc horn member arcuate surface disposed in opposition to each other.

3. The arc management system of claim 2 wherein:

said first arc horn arcuate surface is generally spheroidal; and said second arc horn arcuate surface is generally spheroidal.

4. The arc management system of claim 1 wherein said conductive bus members include a first pair of elongated, generally planar members and a second pair of elongated, generally planar members, said conductive bus members coupled to each other and forming a conductive bus joint, and wherein each said bus extension conductive member is structured to extend partially about said conductive bus joint.

5. The arc management system of claim 4 wherein said conductive bus joint has a thickness, and wherein:
wherein said bus extension conductive member includes a generally planar extended leg, a generally planar bight and a generally planar truncated leg;
said bight having a length slightly greater than the conductive bus joint thickness;
said extended leg extending generally perpendicular to said bight;
said truncated leg extending generally perpendicular to said bight; and
said extended leg and said truncated leg extending from the same side of said bight.

6. The arc management system of claim 4 wherein said electrical enclosure assembly includes an electrical apparatus, said electrical apparatus including a limiting component and wherein:
at least one first arc horn assembly includes a fuse link assembly;
said fuse link assembly including an auxiliary conductor, dielectric mounting block and a fusable wire;
said mounting block coupled to said bus extension conductive member;
said auxiliary conductor coupled to said mounting block;
said fusible wire coupled to, and in electrical communication with, said auxiliary conductor; and
said fusible wire coupled to, and in electrical communication with, said bus extension conductive member.

7. The arc management system of claim 6 wherein
said auxiliary conductor coupled to, and in electrical communication with, one of a line or a load;
said fuse link assembly dielectric mounting block including a body with a first mounting surface and a second mounting surface;
said mounting block body first mounting surface coupled to said bus extension conductive member; and
said auxiliary conductor coupled to said mounting block body second mounting surface.

8. The arc management system of claim 1 wherein said conductive bus members include a landing pad and wherein said bus extension conductive member includes an L-shaped member disposed at the landing pad distal end.

9. The arc management system of claim 8 wherein said bus extension conductive member is unitary with said landing pad.

10. The arc management system of claim 1 wherein:
said ground conductive member includes a generally planar body; and
said ground conductive member body is coupled to, and aligned with, a housing assembly sidewall.

11. An electrical enclosure assembly structured to enclose an electrical apparatus, said electrical enclosure assembly comprising:
a housing assembly including a number of generally planar sidewalls defining an enclosed space;
a conductive bus assembly including a number of conductive bus members, said conductive bus members generally disposed within said enclosed space and spaced from said sidewalls;
an arc management system including a number of conductive bus extension assemblies, a number of first arc horn assemblies, a number of second arc horn assemblies, and a number of ground conductor assemblies;
each of said number of conductive bus extension assemblies including a conductive member;
each of said number of first arc horn assemblies including a conductive arc horn member;
each first arc horn member in electrical communication with an associated bus extension conductive member;
each of said number of second arc horn assemblies including a conductive arc horn member;
each of said number of ground conductor assemblies including a ground conductive member;
each second arc horn member in electrical communication with an associated ground conductor assembly ground conductive member; and
each first arc horn member associated with a second arc horn member and disposed an effective distance therefrom.

12. The electrical enclosure assembly of claim 11 wherein:
said first arc horn member including an arcuate surface;
said second arc horn member including an arcuate surface; and
said first arc horn member arcuate surface and said second arc horn member arcuate surface disposed in opposition to each other.

13. The electrical enclosure assembly of claim 12 wherein:
said first arc horn arcuate surface is generally spheroidal; and
said second arc horn arcuate surface is generally spheroidal.

14. The electrical enclosure assembly of claim 11 wherein:
said conductive bus members include a first pair of elongated, generally planar members and a second pair of elongated, generally planar members, said conductive bus members coupled to each other; and
forming a conductive bus joint, and wherein each said bus extension conductive member is structured to extend partially about said conductive bus joint.

15. The electrical enclosure assembly of claim 14 wherein:
said conductive bus joint has a thickness;
said bus extension conductive member includes a generally planar extended leg, a generally planar bight and a generally planar truncated leg;
said bight having a length slightly greater than the conductive bus joint thickness;
said extended leg extending generally perpendicular to said bight;
said truncated leg extending generally perpendicular to said bight; and
said extended leg and said truncated leg extending from the same side of said bight.

16. The electrical enclosure assembly of claim 14 wherein:
said electrical enclosure assembly includes an electrical apparatus, said electrical apparatus including a limiting component;
at least one first arc horn assembly includes a fuse link assembly;
said fuse link assembly including an auxiliary conductor, dielectric mounting block and a fusable wire;
said mounting block coupled to said bus extension conductive member;
said auxiliary conductor coupled to said mounting block;
said fusible wire coupled to, and in electrical communication with, said auxiliary conductor; and
said fusible wire coupled to, and in electrical communication with, said bus extension conductive member.

17. The electrical enclosure assembly of claim 16 wherein:
said auxiliary conductor coupled to, and in electrical communication with, one of a line or a load;
said fuse link assembly dielectric mounting block including a body with a first mounting surface and a second mounting surface;

said mounting block body first mounting surface coupled to said bus extension conductive member; and said auxiliary conductor coupled to said mounting block body second mounting surface.

18. The electrical enclosure assembly of claim 11 wherein said conductive bus members include a landing pad and wherein said bus extension conductive member includes an L-shaped member disposed at the landing pad distal end.

19. The electrical enclosure assembly of claim 18 wherein said bus extension conductive member is unitary with said landing pad.

20. The electrical enclosure assembly of claim 11 wherein:

said ground conductive member includes a generally planar body; and said ground conductive member body is coupled to, and aligned with, a housing assembly sidewall.

\* \* \* \* \*